United States Patent [19]

Hien et al.

[11] Patent Number: 4,560,869

[45] Date of Patent: Dec. 24, 1985

[54] METHOD AND APPARATUS FOR SCANNING RADIATED ENERGY USING A SINGLE MIRROR WITH A PLURALITY OF PIVOTAL POSITIONS

[75] Inventors: Rochus Hien, Speyer; Wolfgang Weigel, Dossenheim; Horst Vierling, Heidelberg, all of Fed. Rep. of Germany

[73] Assignee: Eltro GmbH, Heidelberg, Fed. Rep. of Germany

[21] Appl. No.: 701,802

[22] Filed: Feb. 15, 1985

Related U.S. Application Data

[63] Continuation of Ser. No. 398,833, Jul. 16, 1982.

[30] Foreign Application Priority Data

Jul. 18, 1981 [DE] Fed. Rep. of Germany ....... 3128469

[51] Int. Cl.[4] .............................................. G02B 27/17
[52] U.S. Cl. .................................... 250/235; 250/334; 250/347; 350/6.6; 350/6.91
[58] Field of Search ............... 250/234, 235, 334, 347; 350/6.5, 6.6, 6.9, 6.91, 486; 358/206, 208, 293

[56] References Cited

U.S. PATENT DOCUMENTS

| 3,742,238 | 6/1973 | Hoffman, II | ................... 350/6.91 X |
| 3,912,927 | 10/1975 | Hoffman, II | ................... 250/334 X |
| 4,262,199 | 4/1981 | Bridges et al. | ................... 250/347 X |

*Primary Examiner*—Edward P. Westin
*Attorney, Agent, or Firm*—Handal & Morofsky

[57] ABSTRACT

The method and apparatus for scanning for radiated energy employs a scanning mirror (1) pivoting azimuthally about a vertical scanning axis (2) and capable of being pivoted also about a pivotal axis (3) that makes an angle with the scanning axis. The mirror reflects the incident IR energy onto a vertically disposed field composed on n individual IR detector elements (22) having $(n-1)$ spacings of equal magnitude. The horizontal motion of the mirror takes place in customary manner but the pivotal motion is smaller than the individual detector elements and their separations. Therefore, the same thermal image requires several pivotal processes and, hence, also several mutually parallel horizontal scanning motions, resulting in achieving greater resolution of the image.

19 Claims, 11 Drawing Figures

METHOD AND APPARATUS FOR SCANNING RADIATED ENERGY USING A SINGLE MIRROR WITH A PLURALITY OF PIVOTAL POSITIONS

This application is a continuation of Ser. No. 398,833 7/16/82.

TECHNICAL FIELD

The invention relates to a method and apparatus for scanning radiated energy in a system where an optically generated image is detected by an array of photocells and amplified for display, using one side of a mirror to scan the image over the photocell array and the other side to scan an amplified visible light raster.

BACKGROUND ART

A method of this kind is the subject of U.S. Pat. No. 3,912,927 of Hoffman corresponding to West German Auslegeschrift No. 23 32 245, the disclosures of which is hereby incorporated by reference. The apparatus employed therein only permits the second pivotal bearing to perform a single pivoting between two defined positions. Accordingly, the scanned field is as large as the individual detector elements including their separations and this brings about an image resolution that is not always adequate.

DISCLOSURE OF INVENTION

It is the basic objective of the present invention to improve the resolution while using a method of the same general type. This objective is attained, according to the invention, by scanning a field with overlapping scanning paths over the lines of detector elements. The higher resolution so obtained can be achieved with commercially available parts and with ease. Moreover, it is also possible with comparable ease to retrofit already existing apparatus using only pivotal operation for each detector field.

BRIEF DESCRIPTION OF THE DRAWINGS

The invention will now be described in detail with the aid of the drawings where similar parts carry the same reference numbers in the various figures where.

BEST MODE FOR CARRYING OUT THE INVENTION

Figure 1:
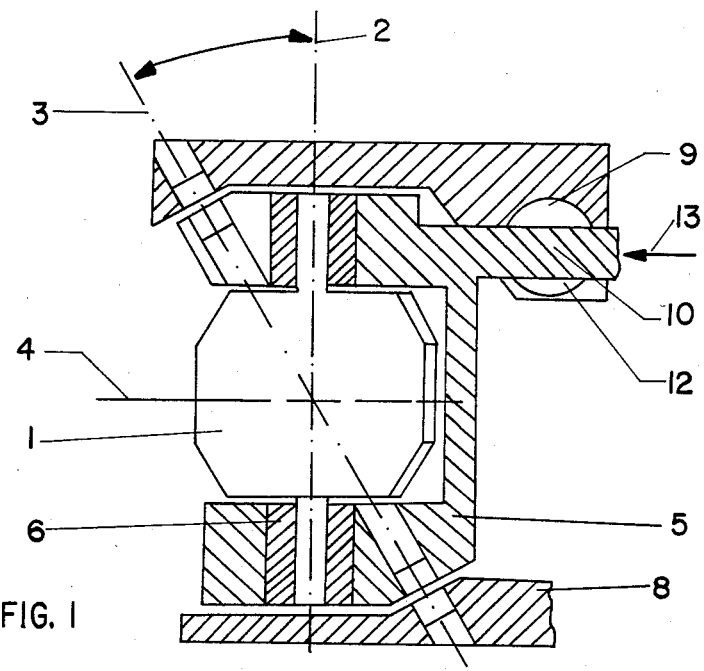
FIG. 1 is a sectional view through the bearing and drive elements of the scanning mirror.

As shown in FIG. 1, the scanning mirror 1 may be pivoted about the scanning axis 2 and also about the pivotal axis 3 for the purpose of a horizontal scanning to detect infra-red radiated energy. The pivotal axis 3 and the scanning axis together define an angle indicated with a double arrow in the drawing. Further shown is the optical axis 4 relative to which the scanning mirror is disposed at an angle of approximately 45°. The scanning axis 2 is a part of the scanning mirror which is also fastened to the gimbaled frame 5 and which is moved about the scanning axis 2 by the motor 6. The housing 8 serves for support of the gimbal frame 5 and its elements 1, 6 and of the drive means 9. The drive means 9 causes the shaft 10 to apply a force to the gimbal frame 5 via the angled extension 12 thereon, so that the gimbal frame 5 pivots about the pivotal axis 3.

Figure 2:
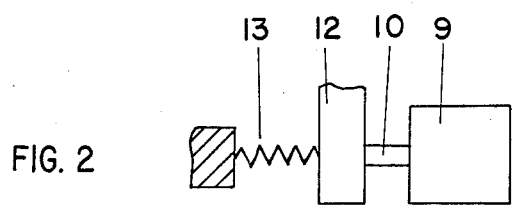
FIG. 2 shows the drive of the pivotal bearing device in the form of an electric motor cooperating with a spring force as seen in the direction of the arrow in FIG. 1.

FIG. 2 is another illustration of the drive 9 for the angular extension 12 which, together with the mirror 1, the scanning axis 2, the gimbal frame 5 and the motor 6 forms the pivotal bearing apparatus. This illustration gives a view in the direction of the arrow 13 of FIG. 1. The drive 9 may be embodied in a number of different ways of which five will be described below.

Figure 3:
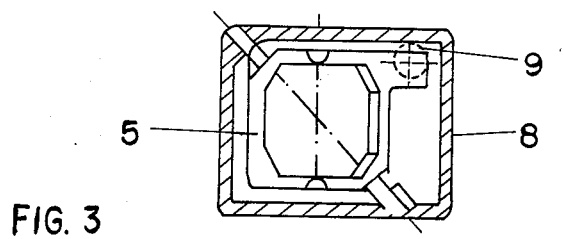
FIG. 3 is a schematic top view of the apparatus of FIG. 1.
Figure 4:
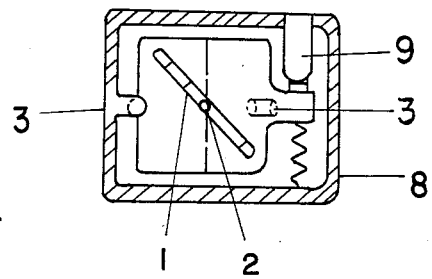
FIG. 4 is a view of the apparatus of FIG. 3 when pivoted upwardly.

FIGS. 3 and 4 show different views of the drive 9 in the form of an electric motor. In this example, the motor is a linear stepping motor which moves the scanning mirror 1 including the gimbal frame 5 about the pivotal axis 3 in well-defined steps in the forward and backward directions.

Figure 5:
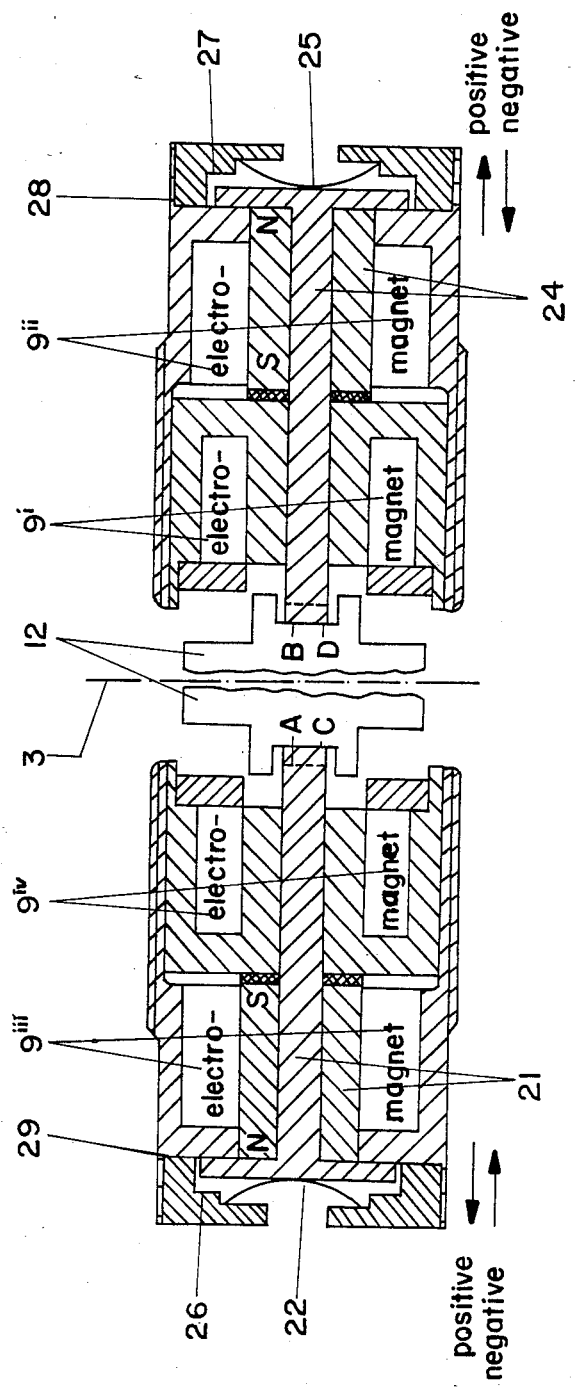
FIG. 5 shows a variant of the drive of FIGS. 1 and 2, each having two pairs of controllable electromagnets disposed on either side of the pivotal axis.

Another embodiment of the drive 9 is shown in FIG. 5. In this example, the pivotal bearing apparatus 1, 2, 5, 6, 12 is engaged, via the angled part 12, with the aid of combined electro-magnets $9'$ to $9^{IV}$ that are disposed on both sides of the pivotal axis 3 and have a suitable control. In this example, the magnets $9''$ and $9'''$ are embodied as reversible solenoids. The pivotal motion is obtained as follows:

| Pivotal position A: | magnet $9^{III}$ | | positive |
|---|---|---|---|
| | magnet $9^{IV}$ | active | |
| | magnet $9^{II}$ | | negative |
| | magnet $9^{I}$ | inactive | |
| Pivotal position B: | magnet $9^{I}$ | active | |
| | magnet $9^{II}$ | | negative |
| | magnet $9^{III}$ | | negative |
| | magnet $9^{IV}$ | inactive | |
| Pivotal position C: | magnet $9^{I}$ | inactive | |
| | magnet $9^{II}$ | | positive |
| | magnet $9^{III}$ | | negative |
| | magnet $9^{IV}$ | active | |
| Pivotal position D: | magnet $9^{I}$ | active | |
| | magnet $9^{II}$ | | positive |
| | magnet $9^{III}$ | | negative |
| | magnet $9^{IV}$ | inactive | |
| Pivotal position C: | magnet $9^{I}$ | inactive | |
| | magnet $9^{II}$ | | negative |
| | magnet $9^{III}$ | | negative |
| | magnet $9^{IV}$ | active | |

| Pivotal position B: | magnet $9^I$ | active | |
|---|---|---|---|
| | magnet $9^{II}$ | | negative |
| | magnet $9^{III}$ | | positive |
| | magnet $9^{IV}$ | inactive | |

Pivotal Position A

When magnet $9^{II}$ is switched positive, part 21, which may be equipped, for example, with an axially magnetized permanent magnet, is attracted to surface 26 so that the contacting end of part 21 is in position A. When the magnet $9^{IV}$ is activated, part 12 is pulled against the stop of part 21 and is located in position A. For the subsequent pivotal position, magnet $9^{II}$ is switched negative and part 24, which is constructed in the same way as part 21, is pulled against surface 28 with the aid of spring 25. Thereafter, part 24 has its stop end in position B.

Pivotal Position B

The part 24 is in position B and magnet $9^{II}$ remains switched negative.

The magnet $9^I$ is activated, causing part 12 to be pulled up against the stop of part 24. The part 12 is located in position B.

For the subsequent pivotal position, magent $9^{III}$ is made negative, causing part 21 to be pulled up against surface 29 with the assistance of spring 22. The part 21 is now in position C.

Pivotal Position C

Activation of magnet $9^{IV}$ causes part 12 to be pulled up against the stop of part 21, placing it in position C.

The magnet $9^{II}$ is now switched positive causing part 24 to be pulled up against surface 27; the stop end of part 24 is now in position D.

Pivotal Position D

The part 24 is already in position D. The magnet $9^{II}$ remains positive. The magnet $9^I$ is activated and part 12 is pulled up against the stop of part 24. The part 12 is located in position D.

The magnet $9^{III}$ remains negative and its part 21 is in position C.

Pivotal Position C

The part 21 is already in position C and magnet $9^{III}$ is negative. The magnet $9^{IV}$ is activated, causing part 12 to be pulled to the stop of part 21 and placing it in position C. The magnet $9^{II}$ is switched negative and part 24 is caused to move to position B.

Pivotal Position B

The part 24 is in position B and magnet $9^{II}$ remains negative. The magnet $9^I$ is activated and part 12 is pulled into position B. The magnet $9^{III}$ is switched positive and part 21 is placed in position A.

Figure 6:
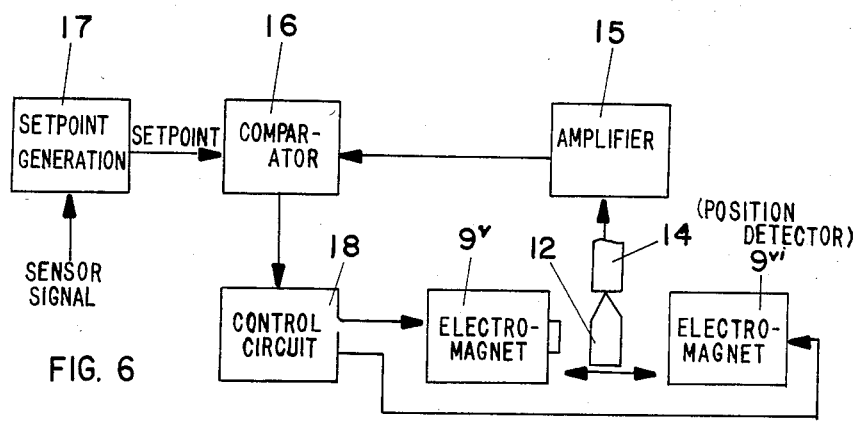
FIG. 6 is a block circuit diagram of a variant of the drive of FIGS. 1 and 2, each having a single electromagnet on either side of the pivotal axis.

Another embodiment of the drive 9 is seen in FIG. 6 where a suitably controlled electromagnet $9^V$ and $9^{VI}$ that causes the pivotal motion is placed on both sides of the pivotal axis 3. The position detector 14 senses the pivotal position and transforms this information into an electrical signal. This signal is amplified in the amplifier 15 and compared in the comparator 16 with the setpoint unit 17 (pivotal position setpoint) that is connected to the scanning mirror. The control circuit 18 controls the two electromagnets in accordance with the output signal of the comparator circuit. The setpoint value, i.e., the pivotal position, is changed only at the scan reversal point.

Figure 7:
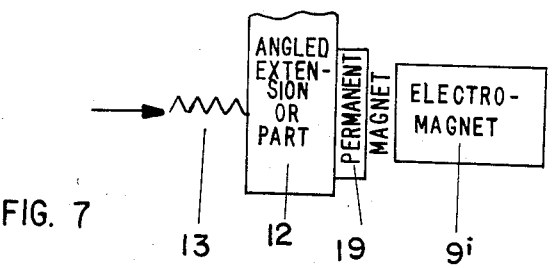
FIG. 7 shows a variant of the drive of FIGS. 1 and 2 having a spring on one side of the pivotal axis and an electromagnet and opposing permanent magnet on the other side of the pivotal axis.

Still another embodiment of the drive 9 is seen in FIG. 7 where the pivotal motion is produced by an electromagnet, e.g., the magnet $9^I$, disposed on one side of the pivotal axis 3 and pressing against the spring 13 located on the other side of the pivotal axis. The spring presses on the angled part 12 in the direction of the electromagnet. By suitable control of the exciting voltage, part 12 is placed exactly in the corresponding pivotal position by means of the permanent magnet 19 fastened thereto.

Figure 8:
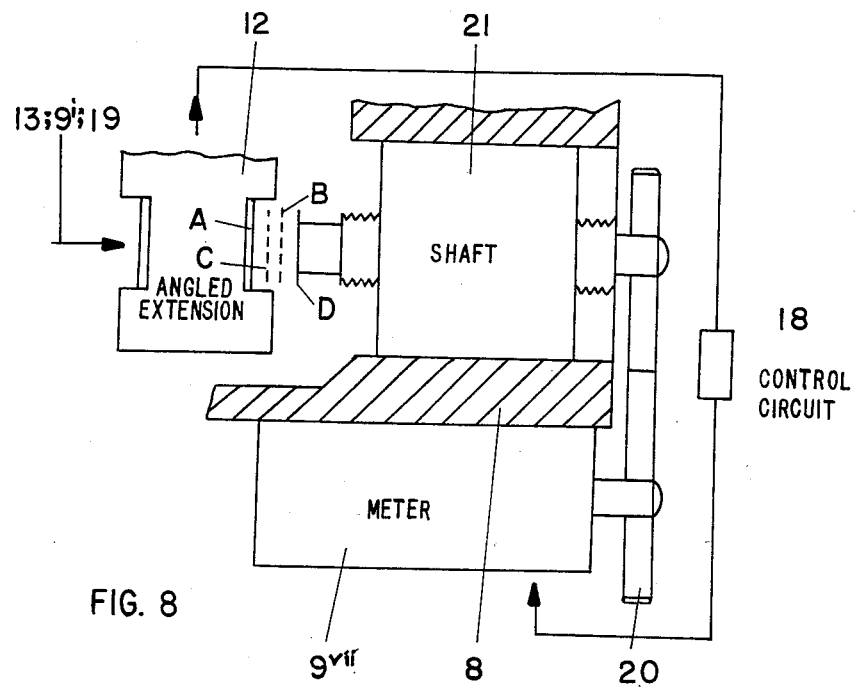
FIG. 8 shows further variants of the drive of FIGS. 1 and 2, wherein, on one side, the rotational motion of the motor is transformed into a linear motion while a spring or magnetic forces acts in opposition on the other side of the pivotal axis.

A final embodiment of drive 9 is shown in FIG. 8, where the pivotal motion is produced by transforming the rotary motion of a motor $9^{VII}$ equipped with a decoder (pacemaker) into a linear motion, via the converter 20, 21, that may be present, for example, in the form of a transmission 20 with a shaft 21. The converter acts alone on part 12 of the pivotal bearing device. The spring 13 or the electromagnet with the permanent magnet 19 may be used to exert a constant counterforce, indicated in this picture by an arrow. The electrical controller is marked with reference number 18.

All embodiments share the feature of controlling the pivotal motion that occurs during the dead time of the scanning motion of the mirror 1. The drive 9 is so constructed that the field which is scanned during a pivotal operation is smaller than the total field of all the individual IR detector elements 22 (FIG. 9) disposed in the vertical direction with equal separation.

In this way, a single scan of the entire field requires several pivotal steps. In the above-described examples, a total field is scanned with four pivotal motions in the vertical direction, a so-called 4-fold line displacement, this field being somewhat larger than the sum of the individual elements and their mutual separations. In other examples, not shown in the drawing, it is of course possible to subdivide the single scan of the total field into fewer or more line displacements without departing from the scope of the invention. The number of subdivisions is a compromise between the required resolution on the one hand and of the economy of such a device on the other hand.

Figure 10:
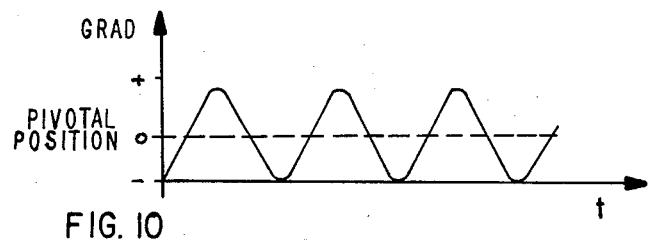
FIG. 10 is a diagram showing the position of the horizontally oscillating scanning mirror.
Figure 11:
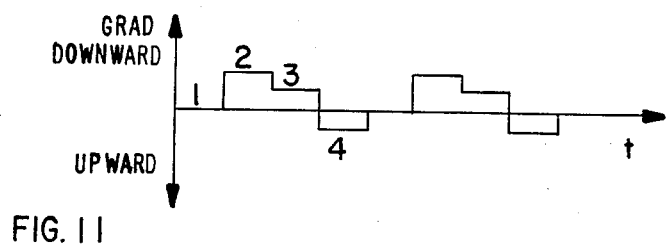
FIG. 11 illustrates the sequence of four partial pivoting steps, according to FIG. 9.
Figure 9:
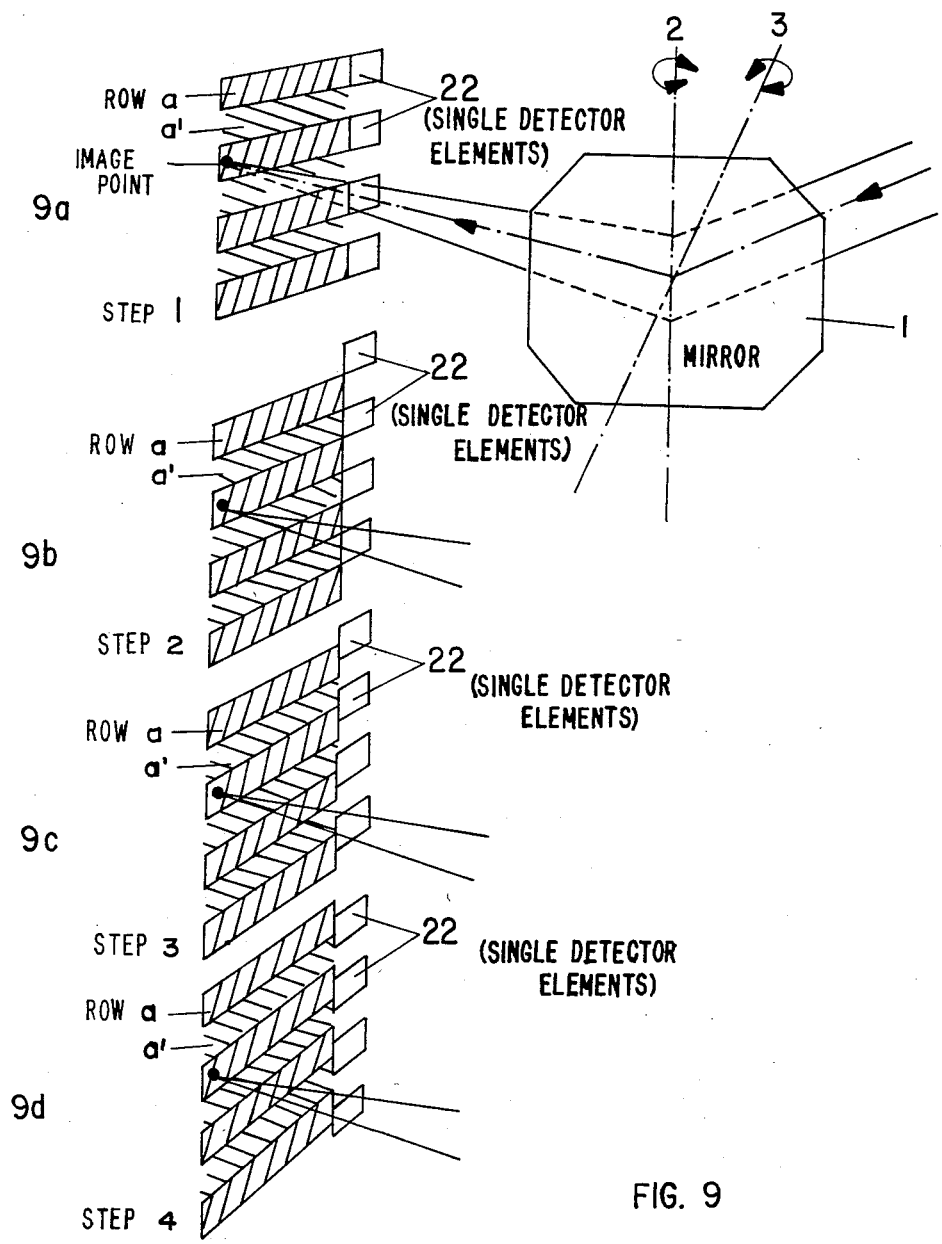
FIG. 9 illustrates the division of the pivotal process of the pivotal bearing apparatus into several partial pivotal steps for each total field, in this example four steps.

FIGS. 9–11 illustrate the subdivision of a pivotal process into four steps. In FIG. 10, the scanning mirror 1 oscillates azimuthally according to a triangular curve, while FIG. 11, combined with FIG. 9, shows the dividing of the pivotal process into four partial pivotal steps that occur alternately on both sides of the IR detector during the dead time of the horizontal or azimuthal scan motion of the mirror. In the curve of FIG. 11, the sequence of steps is, relative to FIG. 9, 1-2-3-4. Accordingly, in the latter case, the pivoting occurs from the initial position downward by a full height of an element, then upward by half a height of an element along the other side of the field, and, finally, upward by one element height on the initial side.

As individual steps, this means the following: When the scanning mirror 1 is in the position of FIG. 9a (step 1), the information contained in lines a is located under the elements 22 and the information contained in lines a' is not obtained during the first passage of the mirror.

If the scanning mirror 1 is in the position of FIG. 9b (step 2), after pivoting the mirror during the dead time about the pivotal axis 3 by one element width, then the information contained in the lines a' lies below the individual elements 22. The lines a now lie between the individual elements.

If the scanning mirror 1 is in the position of FIG. 9c (step 3), then the mirror was pivoted upward by half an element width about the pivotal axis 3 during the deadtime and after the return motion. Thus, half the information of lines a and a' now lies on the respective individual elements but on their upper halves.

While an illustrative embodiment of the present invention has been described, it is, of course, understood that various modifications will be obvious to those of ordinary skill in the art. Such modifications are within the spirit and scope of the invention which is limited and defined only be the appended claims.

We claim:

1. A method for scanning a radiant image, comprising the steps of:
    (a) defining an image field by scanning a radiant image with a scanning mirror which reflects the radiant image onto a detector array composed of individual elements;
    (b) generating with each of said individual elements a suitable electrical signal by performing an optoelectronic conversion;
    (c) said scanning being performed by pivoting said mirror about a first axis on a first pivotal bearing device using a first drive to perform a horizontal scan having dead times while holding the scanning mirror with a given vertical orientation;
    (d) using a second drive to scan vertical increments with a second pivotal bearing device rotating about a second axis, said second axis being different from said first axis to obtain a vertical displacement of the image field;
    (e) said pivoting of the scanning mirror about the first pivotal bearing device occuring between the scanning of vertical increments to define several image fields;
    (f) said scanning of vertical increments about the second pivotal bearing device occurring at such time period during which the scanning mirror is located at a position corresponding to said dead times of the horizontal scanning motion; and
    (g) said scanning of vertical increments resulting in incrementing said scanning mirror among four vertical positions, each of said positions corresponding to one of four scanned fields, the first of said four positions corresponding to a field having an initial field position, the second of said four positions corresponding to a second field having a second field position, said second field position being displaced with respect to said first field position by a first vertical increment in a first direction, the third of said four positions corresponding to a third field position, said third field position being displaced with respect to said first field position by a second vertical increment in said first direction, said second vertical increment being half the magnitude of said first vertical increment, and the fourth of said four positions corresponding to a fourth field position, said fourth field position being displaced with respect to said first field position by a third vertical increment, in a second direction, said second direction being opposite said first direction and said third vertical increment having the same magnitude as said second vertical increment.

2. The method according to claim 1, in which said array is composed of n individual detector elements and (n−1) separations of equal magnitude.

3. A method as in claim 1 wherein said individual elements are positioned with their centers spaced apart by a distance two times as great as their height.

4. A method according to claim 1, wherein during a first dead time pivoting takes place from a starting position at a first side of the fields and is followed by pivoting in a second dead time at the opposite side of the fields and is followed in a third dead time by a pivoting at said first side.

5. A method according to claim 1, wherein the pivotal motion is produced by linearly stepping a motor.

6. A method according to claim 1, wherein the pivotal motion is produced about a pivotal axis by a pair of controllable electromagnets disposed about the pivotal axis.

7. A method according to claim 1, wherein the pivotal motion is produced by a single controllable electromagnet disposed about the pivotal axis.

8. A method according to claim 1, wherein the pivotal motion is produced by disposing opposite each other about the pivotal axis a pre-tensed spring and an electromagnet with an opposing permanent magnet.

9. A method as in claim 1 wherein said performance of a horizontal scan is in a direction parallel to a real world horizon.

10. A method as in claim 1, wherein said pivoting about said first axis occurs in two opposite angular directions.

11. A method as in claim 1, wherein said second position follows said first position, said third position follows said second position, and said fourth position follows said third position.

12. An apparatus for scanning a radiant image, comprising:
    (a) a scanning mirror;
    (b) lens means for directing an image onto the front of said scanning mirror;
    (c) a detector array composed of individual detector elements, each of said elements converting radiant energy into electrical energy and each associated with a scan line, said detector array being positioned, configured and dimensioned to receive said radiant image from said front of said mirror;
    (d) movable mirror mounting means for supporting said scanning mirror, comprising:
        (i) a first pivotal bearing device oriented to perform a horizontal scan and to hold the scanning mirror at a given vertical orientation; and
        (ii) a second pivotal bearing device oriented to vary the vertical orientation of said scanning mirror said second pivotal bearing device being disposed at an angle with respect to the first pivotal bearing device;
    (e) a first drive pivoting the scanning mirror about the first pivotal bearing device; and
    (f) a second drive for pivoting the scanning mirror about the second pivotal bearing device among four vertical positions, each of said positions corresponding to one of four scanned fields, the first of said four positions corresponding to a field having an initial field position, the second of said four positions corresponding to a field having a second field position, said second field position being displaced with respect to said first field position by a first vertical increment in a first direction, the third of said four positions corresponding to a third field position, said third field position being displaced with respect to said first field position by a second vertical increment in said first direction, said second vertical increment being half the magnitude of said first vertical increment, and the fourth of said four positions corresponding to a fourth field position, said fourth field position being displaced with respect to said first field position by a third vertical increment in a second direction, said second direction being opposite said first direction and said third vertical increment having the same magnitude as said second vertical increment.

13. An apparatus as in claim 12, wherein said second pivotal bearing device consists substantially of a gimbal frame, an angled part integrally formed thereon and having two sides, said scanning mirror being mounted on said frame on a first axis and wherein said second drive comprises electromagnetic means disposed on both sides of said angled part and acting thereon either alternately or in a complementary manner.

14. An apparatus according to claim 13, wherein electromagnetic means is disposed on one side of said angled part and elastic mechanical means is disposed on the other side of said angled part.

15. An apparatus as in claim 13 wherein the electromagnet means is disposed on both sides of the angled part and on each side consists of an inner and an outer functionally combined controllable solenoid magnets, wherein the outer magnets are reversible solenoids.

16. An apparatus according to claim 13, wherein there is disposed on both sides of the angled part a controllable electric motor and subsequent, sequential elements common to each motor, comprising a position sensor for detecting the pivotal position of the scanning mirror and for converting this information into electrical signals, an amplifier for converting said electrical signals and a comparator unit for comparing said signals with the signals from a setpoint unit coupled to the scanning mirror, the output signals from said comparator unit being applied to a control circuit for controlling said motors.

17. An apparatus according to claim 13, wherein the drive on one side of the angled part consists of a pretensed spring opposed, on the other side, by an electromagnet which cooperates with a permanent magnet mounted opposite thereto about the pivotal axis, and means for controlling the excitation voltage of said electromagnet.

18. An apparatus according to claim 13, wherein the drive on one side of the angled part consists of a motor equipped with a decoder whose rotary motions are linearized by a converter formed by a transmission and shaft and acts on one side of the angled part while a constant counter force acts on the other side and is embodied as a spring.

19. Apparatus as in claim 12 wherein said mounting means includes means for moving said mirror among the four field positions in the order: first, second, third and fourth.

* * * * *